United States Patent
Watanabe et al.

(10) Patent No.: US 9,106,354 B2
(45) Date of Patent: Aug. 11, 2015

(54) OPTICAL FREQUENCY-DIVISION MULTIPLEXER, OPTICAL COMMUNICATION SYSTEM, AND OPTICAL FREQUENCY-DIVISION MULTIPLEXING METHOD

(71) Applicant: FUJITSU LIMITED, Kawasaki-shi, Kanagawa (JP)

(72) Inventors: Shigeki Watanabe, Kawasaki (JP); Tomoyuki Kato, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 214 days.

(21) Appl. No.: 13/771,606

(22) Filed: Feb. 20, 2013

(65) Prior Publication Data
US 2013/0272709 A1    Oct. 17, 2013

(30) Foreign Application Priority Data

Apr. 13, 2012    (JP) .................................. 2012-092297

(51) Int. Cl.
| | |
|---|---|
| H04J 14/02 | (2006.01) |
| H04J 4/00 | (2006.01) |
| H04B 10/12 | (2006.01) |
| H04J 14/00 | (2006.01) |
| H04B 10/2575 | (2013.01) |
| H04J 11/00 | (2006.01) |

(52) U.S. Cl.
CPC ............. *H04J 14/00* (2013.01); *H04J 14/0272* (2013.01); *H04J 14/0279* (2013.01); *H04J 14/0298* (2013.01); *H04B 10/2575* (2013.01); *H04J 2011/0009* (2013.01)

(58) Field of Classification Search
None
See application file for complete search history.

(56) References Cited

U.S. PATENT DOCUMENTS

| | | | | |
|---|---|---|---|---|
| 5,596,667 | A * | 1/1997 | Watanabe | 385/122 |
| 6,275,316 | B1 * | 8/2001 | Tischer et al. | 398/181 |
| 7,840,138 | B2 * | 11/2010 | McEwan et al. | 398/135 |
| 7,940,454 | B2 * | 5/2011 | Watanabe | 359/341.3 |
| 8,103,166 | B2 * | 1/2012 | Liu | 398/65 |
| 2011/0229138 | A1 * | 9/2011 | Watanabe | 398/79 |
| 2012/0189308 | A1 * | 7/2012 | Watanabe | 398/79 |

FOREIGN PATENT DOCUMENTS

| | | |
|---|---|---|
| JP | 2011-215603 | 10/2011 |
| WO | WO 94/09403 | 4/1994 |
| WO | WO 2011/052075 | 5/2011 |

OTHER PUBLICATIONS

Extended European Search dated Apr. 13, 2013 in European Patent Application 13156943.6-1860.

* cited by examiner

*Primary Examiner* — Ken Vanderpuye
*Assistant Examiner* — Jai Lee
(74) *Attorney, Agent, or Firm* — Staas & Halsey LLP

(57) ABSTRACT

An optical frequency-division multiplexer includes: a first optical coupler configured to receive a first wavelength-division multiplexed light obtained by wavelength-division multiplexing a first carrier light and a first monitor light and split the first carrier light and the first monitor light from each other; an optical modulator configured to optically modulate the split first carrier light using a signal including a first data signal so as to multiplex the first data signal with the first carrier light; a receiver configured to receive a branched part of the split first monitor light and demodulate a second data signal from the first monitor light; and a second optical coupler configured to couple a remaining part of the split first monitor light and the first carrier light with which the first data signal has been multiplexed.

16 Claims, 18 Drawing Sheets

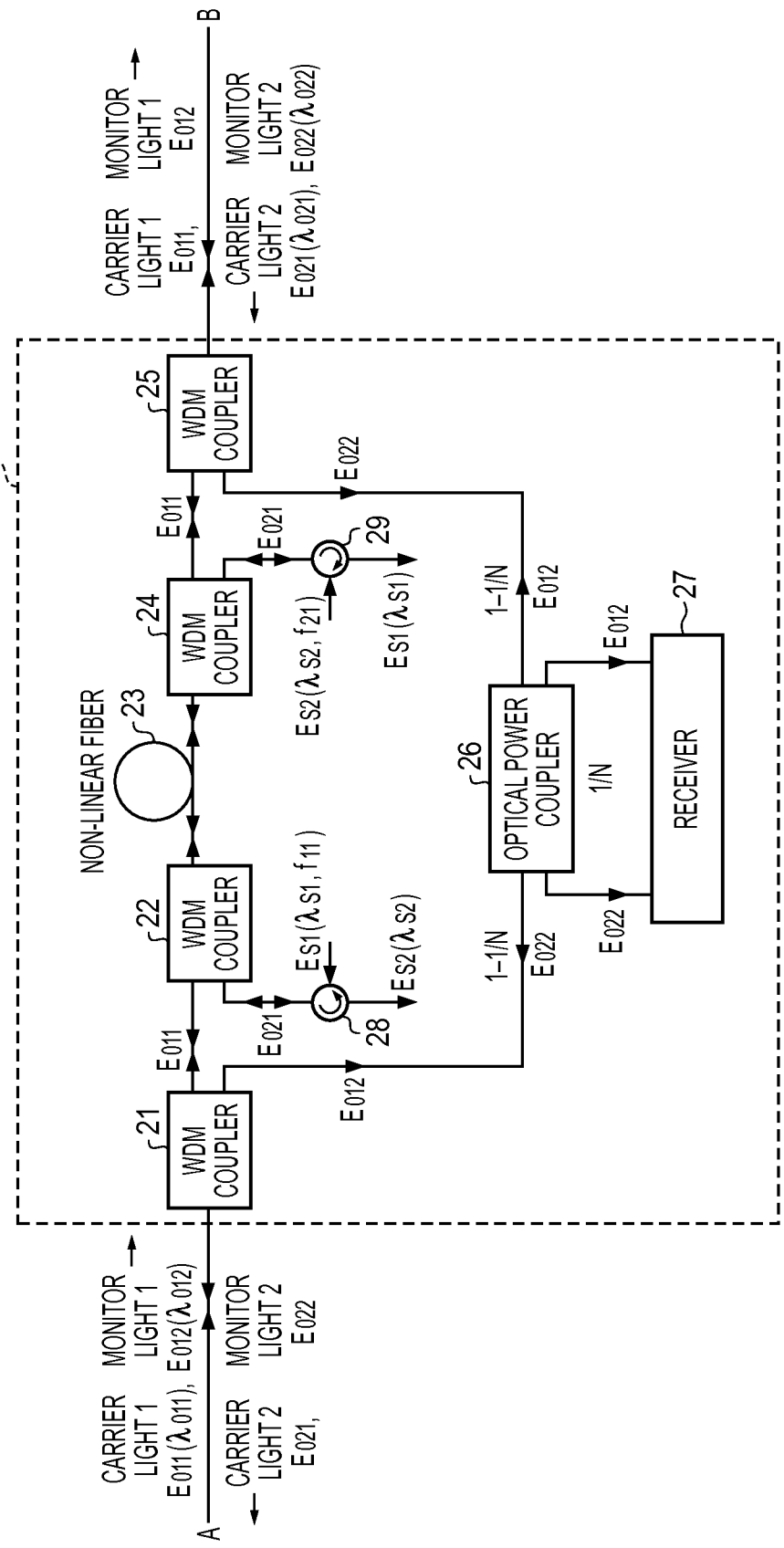

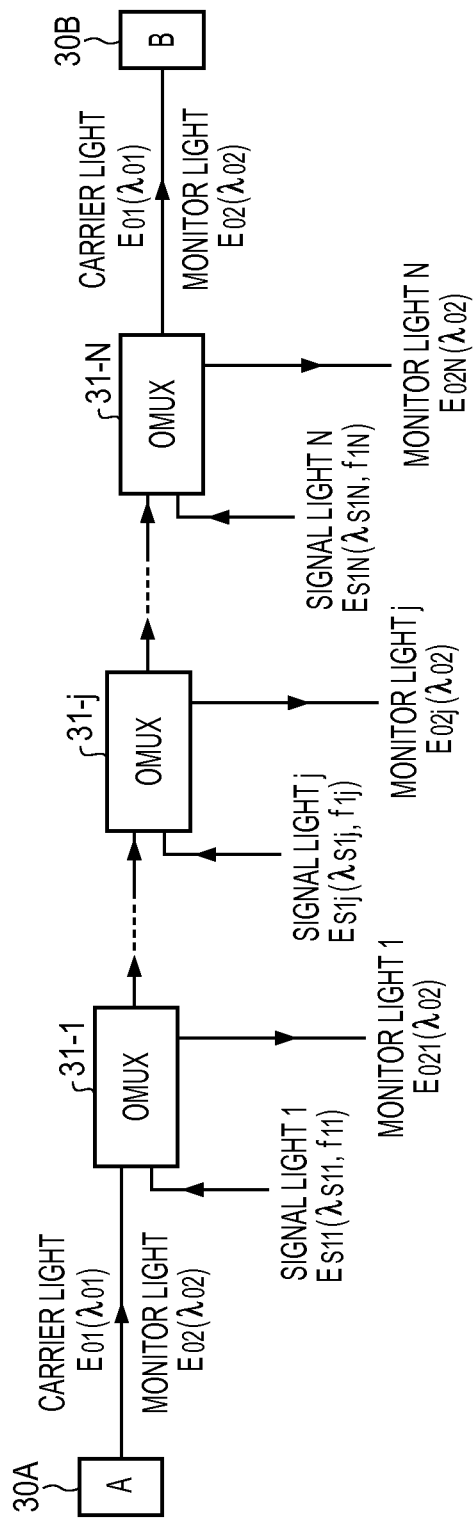

OPTICAL FREQUENCY-DIVISION MULTIPLEXER, OPTICAL COMMUNICATION SYSTEM, AND OPTICAL FREQUENCY-DIVISION MULTIPLEXING METHOD

CROSS-REFERENCE TO RELATED APPLICATION

This application is based upon and claims the benefit of priority of the prior Japanese Patent Application No. 2012-092297, filed on Apr. 13, 2012, the entire contents of which are incorporated herein by reference.

FIELD

The embodiments discussed herein are related to an optical frequency-division multiplexer, an optical communication system, and an optical frequency-division multiplexing method which are used in an optical network.

BACKGROUND

In future optical networks, a large volume of information will be transmitted using existing optical fiber communication systems, and processing such as multiplexing and demultiplexing of a signal light, add and drop of a signal light, wavelength conversion, and switching, etc. will be used in a device such as an optical relay node and the like which will be provided at a point located far from a terminal apparatus. At that time, it will be effective to realize an optical network with the low power consumption in order to multiplex, demultiplex, and transmit information while reducing the number of conversion operations between an optical signal and an electrical signal as much as possible.

However, under these circumstances, at an optical relay node and the like in an optical network, conversion between an optical signal and an electrical signal is performed in the same way as in a terminal apparatus. In such a case, the transmitted optical signal is converted to an electrical signal first, the electrical signal is electrically processed, and then, the electrical signal is converted to an optical signal again. In this case, the circuit configuration is complicated and a larger amount of power is used in order to compensate for a loss due to photoelectric conversion.

On the other hand, in order to control an optical network, various types of information are monitored in real time at each point throughout the entire network, and effective network control is performed on the basis of a monitor signal. Also, in future information networks, the volume of information of each of various monitor signals is likely to increase considerably. Optical processing which does not employ photoelectric conversion allows an operation with a sufficiently broad band to be performed, as compared to processing of an electrical signal, regardless of the volume of information, and is, therefore, effective. Furthermore, a technology which enables efficient multiplexing and propagation of information existing at each point is very important in realizing a power conserving, flexible optical network.

Currently, for example, for transmitting monitor information, when monitor information is transmitted as an electrical signal separately from an optical signal, or even when monitor information is transmitted as optical information, a method in which electrical information is converted to optical information, and then, is written into a header part of a signal or the like, or a method using a dedicated optical wave, etc. is used.

SUMMARY

According to an aspect of the invention, an optical frequency-division multiplexer includes: a first optical coupler configured to receive a first wavelength-division multiplexed light obtained by wavelength-division multiplexing a first carrier light and a first monitor light and split the first carrier light and the first monitor light from each other, the first wavelength-division multiplexed light being supplied to a first input and output point from an optical network; an optical modulator configured to optically modulate the first carrier light split by the first optical coupler using a signal including a first data signal so as to multiplex the first data signal with the first carrier light; a receiver configured to receive a branched part of the first monitor light split by the first optical coupler and demodulate a second data signal from the first monitor light; and a second optical coupler configured to couple a remaining part of the first monitor light split by the first optical coupler and the first carrier light with which the first data signal has been multiplexed and transmit the coupled light from a second input and output point to the optical network.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 7 is a configuration diagram of a fifth embodiment of an optical frequency-division multiplexer;

FIG. 9 is a configuration diagram of a first embodiment of an optical communication system;

DESCRIPTION OF EMBODIMENTS

The signal transmission in which a signal is written into a header part of the optical signal, or a technology in which an independent optical carrier for a multiplexed signal is used is employed. Accordingly, the multiplex configuration of an optical signal has become complicated, and there is insufficient power efficiency. In particular, there has been no technology in which, without performing photoelectric conversion, signal information is directly multiplexed with a light propagating in the optical fiber from an arbitrary point.

An optical frequency-division multiplexer capable of multiplexing of information with a carrier light at an installation point to transmit the information, and receiving transmitted information at the installation point will be described below.

Hereinafter, embodiments will be described with reference to the accompanying drawings.

First Embodiment of Optical Frequency-Division Multiplexer (OMUX)

Figure 1:
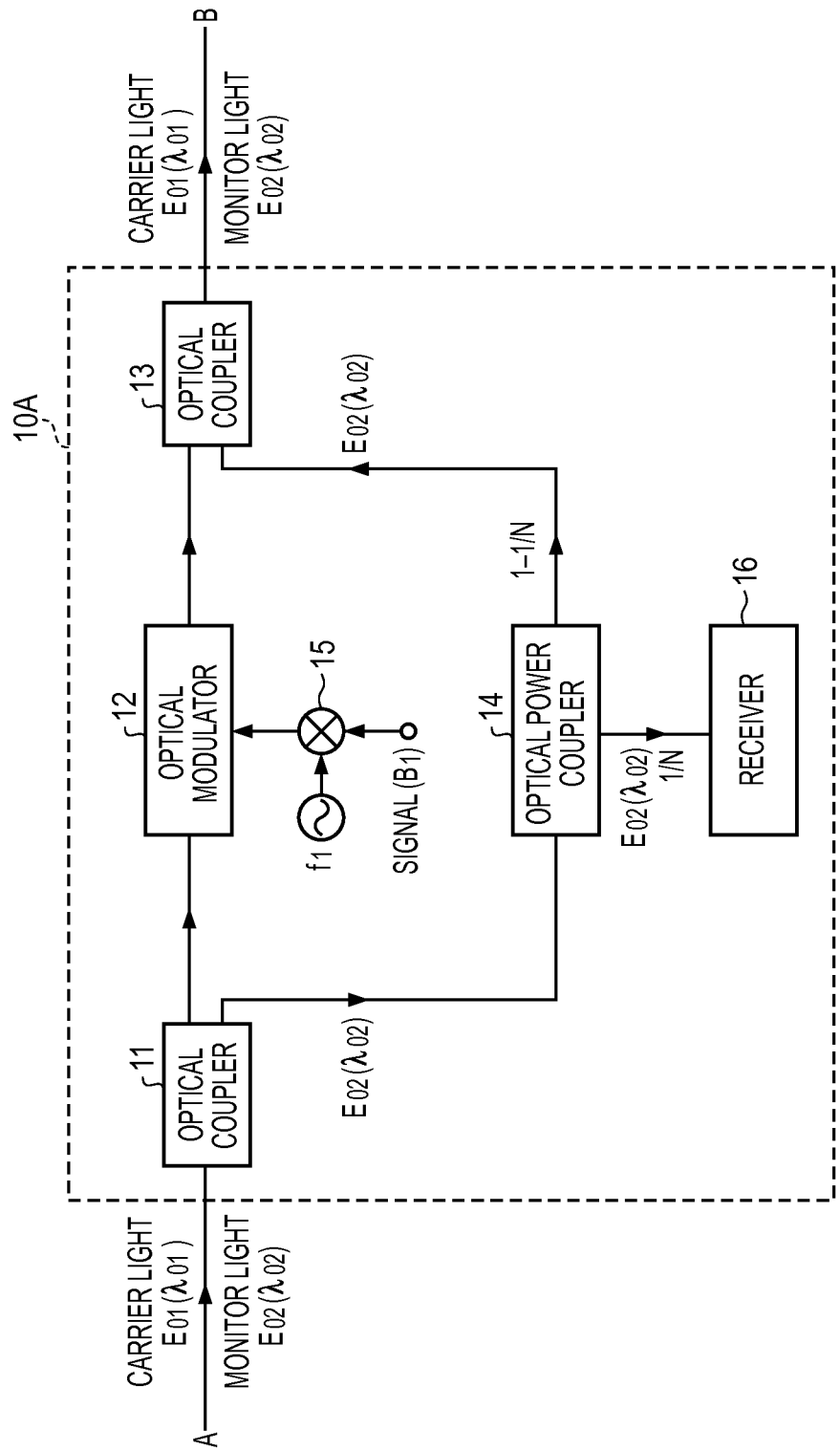
FIG. 1 is a configuration diagram of a first embodiment of an optical frequency-division multiplexer.

FIG. 1 is a configuration diagram of a first embodiment of an optical frequency-division multiplexer. In FIG. 1, first and second input and output points, i.e., a point A and a point B, are connected to an optical network via an optical fiber, and a carrier light $E_{01}$ having a wavelength $\lambda_{01}$ and a monitor light $E_{02}$ having a wavelength $\lambda_{02}$ are propagated from the point A to the point B. In this case, the carrier light $E_{01}$ is used for writing information, i.e., a data signal, at a mid-point between the point A and the point B. On the other hand, information, i.e., a data signal, has been written into the monitor light $E_{02}$ in advance, the information is extracted from the monitor light $E_{02}$ at the mid-point between the point A and the point B, and the information is read.

In an optical frequency-division multiplexer 10A, the carrier light $E_{01}$ and the monitor light $E_{02}$ are supplied to an optical coupler 11 serving as a demultiplexer capable of demultiplexing the wavelength $\lambda_{01}$ and the wavelength $\lambda_{02}$ from each other, and the carrier light $E_{01}$ having the wavelength $\lambda_{01}$ split by the optical coupler 11 is supplied to an optical modulator 12. The optical modulator 12 optically modulates the carrier light $E_{01}$ using a signal including a data signal $B_1$, optical frequency division multiplexes the data signal $B_1$ with the carrier light $E_{01}$, and supplies the resultant light to an optical coupler 13. In this case, as the signal including the data signal $B_1$, a sub-carrier modulated signal $B_1$ obtained by modulating a carrier having a frequency $f_1$ using the data signal $B_1$ in a modulator 15 is used. This sub-carrier modulated signal is an electrical signal. As the optical modulator 12, an intensity modulator, an optical phase modulator, or an optical frequency modulator, etc. is used.

On the other hand, the monitor light $E_{02}$ split with the carrier light $E_{01}$ by the optical coupler 11 is supplied to an optical power coupler 14. The optical power coupler 14 performs power branching on the monitor light $E_{02}$ such that only 1/N of the monitor light $E_{02}$ is branched out, and a receiver 16 receives the branched component to read a data signal. Remaining components [1−(1/N)] of the monitor light $E_{02}$ are coupled with the carrier light $E_{01}$ by the optical coupler 13 serving as a multiplexer, and then, the resultant light is further propagated in the direction to the point B.

Figure 2:
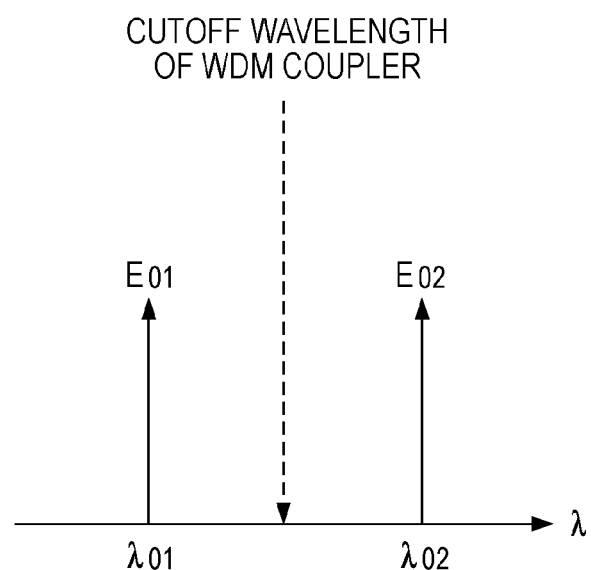
FIG. 2 is a diagram illustrating cutoff wavelength characteristics of a WDM coupler.

Cutoff Wavelength Characteristics of Wavelength-Division Multiplexing (WDM) Coupler WDM couplers are used as the optical coupler 11 and the optical coupler 13. As illustrated in FIG. 2, the wavelengths of the carrier light $E_{01}$ and the monitor light $E_{02}$ are set so as to be in different transmission bands of a WDM coupler. That is, the wavelength of the monitor light $E_{02}$ is set so as to be outside the transmission band of the carrier light $E_{01}$. In this case, the cutoff wavelength of each WDM coupler is set so as to be located in between the wavelength $\lambda_{01}$ and the wavelength $\lambda_{02}$. Thus, optical modulation by a signal may be applied to only the carrier light $E_{01}$. The monitor light $E_{02}$ is split with and coupled with the carrier light $E_{01}$ by the optical coupler 11 and the optical coupler 13 serving as WDM couplers while rarely affecting optical modulation of the carrier light $E_{01}$, and a part of power of the monitor light $E_{02}$ is tapped, i.e., branched, so that a data signal may be effectively read. Note that power loss by the optical modulator 12 may be appropriately compensated using an optical amplifier or the like.

Figure 19:
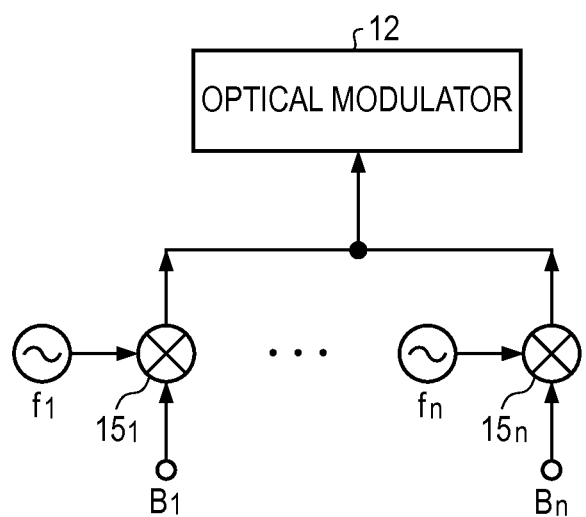
FIG. 19 is a configuration diagram of a variation of a sub-carrier modulation signal generation.

Note that, although, in FIG. 1, the sub-carrier modulation signal $B_1$ obtained by modulating a carrier having the frequency $f_1$ using the data signal $B_1$ is generated in the modulator 15 and is supplied to the optical modulator 12, as illustrated in FIG. 19, a configuration in which sub-carrier modulation signals $B_1$ to $B_n$ obtained by modulating carriers having frequencies $f_1$ to $f_n$ by data signals $B_1$ to $B_n$ are frequency-division multiplexed and the resultant frequency-division multiplexed signal is supplied to the optical modulator 12 may be employed.

Second Embodiment of Optical Frequency-Division Multiplexer (OMUX)

Figure 3:
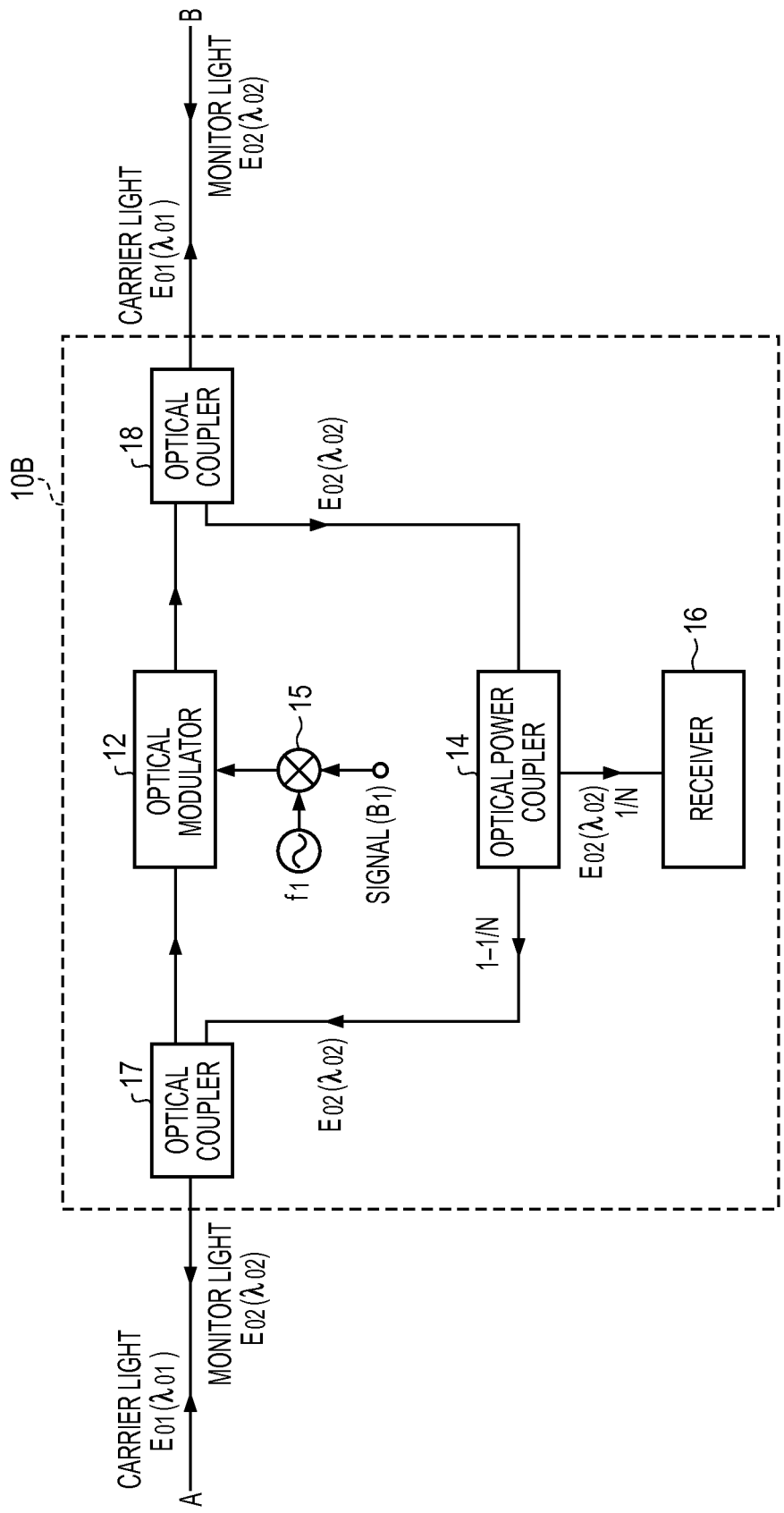
FIG. 3 is a configuration diagram of a second embodiment of an optical frequency-division multiplexer.

FIG. 3 is a configuration diagram of a second embodiment of an optical frequency-division multiplexer. In FIG. 3, the point A and the point B are connected to each other via an optical fiber, the carrier light $E_{01}$ having the wavelength $\lambda_{01}$ is propagated from the point A to the point B, and the monitor light $E_{02}$ having the wavelength $\lambda_{02}$ is propagated from the point B to the point A. In this case, the carrier light $E_{01}$ is used for writing a data signal from a mid-point between the point A and the point B. On the other hand, information (a data signal) has been written into the monitor light $E_{02}$ in advance and the monitor light $E_{02}$ is used for extracting the information at the mid-point between the point A and the point B and reading the information.

In an optical frequency-division multiplexer 10B, the carrier light $E_{01}$ having the wavelength $\lambda_{01}$ is supplied to the optical modulator 12 through an optical coupler 17. The optical modulator 12 optically modulates the carrier light $E_{01}$ using a signal including the data signal $B_1$, optical frequency division multiplexes the data signal $B_1$ with the carrier light $E_{01}$, and supplies the resultant light to an optical coupler 18. In this case, as the signal including the data signal $B_1$, a sub-carrier modulated signal obtained by modulating a carrier having the frequency $f_1$ using the data signal $B_1$ in the modulator 15 is used. This sub-carrier modulated signal is an electrical signal.

On the other hand, the monitor light $E_{02}$ split with the carrier light $E_{01}$ by the optical coupler 18 serving as a demultiplexer capable of demultiplexing the wavelength $\lambda_{01}$ and the wavelength $\lambda_{02}$ from each other is supplied to the optical power coupler 14. The optical power coupler 14 performs power branching on the monitor light $E_{02}$ such that only 1/N of the monitor light $E_{02}$ is branched out, and the receiver 16 receives the branched component to read a data signal. Remaining components [1−(1/N)] of the monitor light $E_{02}$ are coupled with the carrier light $E_{01}$ by the optical coupler 17 serving as a multiplexer, and then, the resultant light is further propagated in the direction to the point A. As the optical coupler 18 and the optical coupler 17 are, for example, WDM couplers having the cutoff wavelength characteristics illustrated in FIG. 2 are used.

Third Embodiment of Optical Frequency-Division Multiplexer (OMUX)

Figure 4:
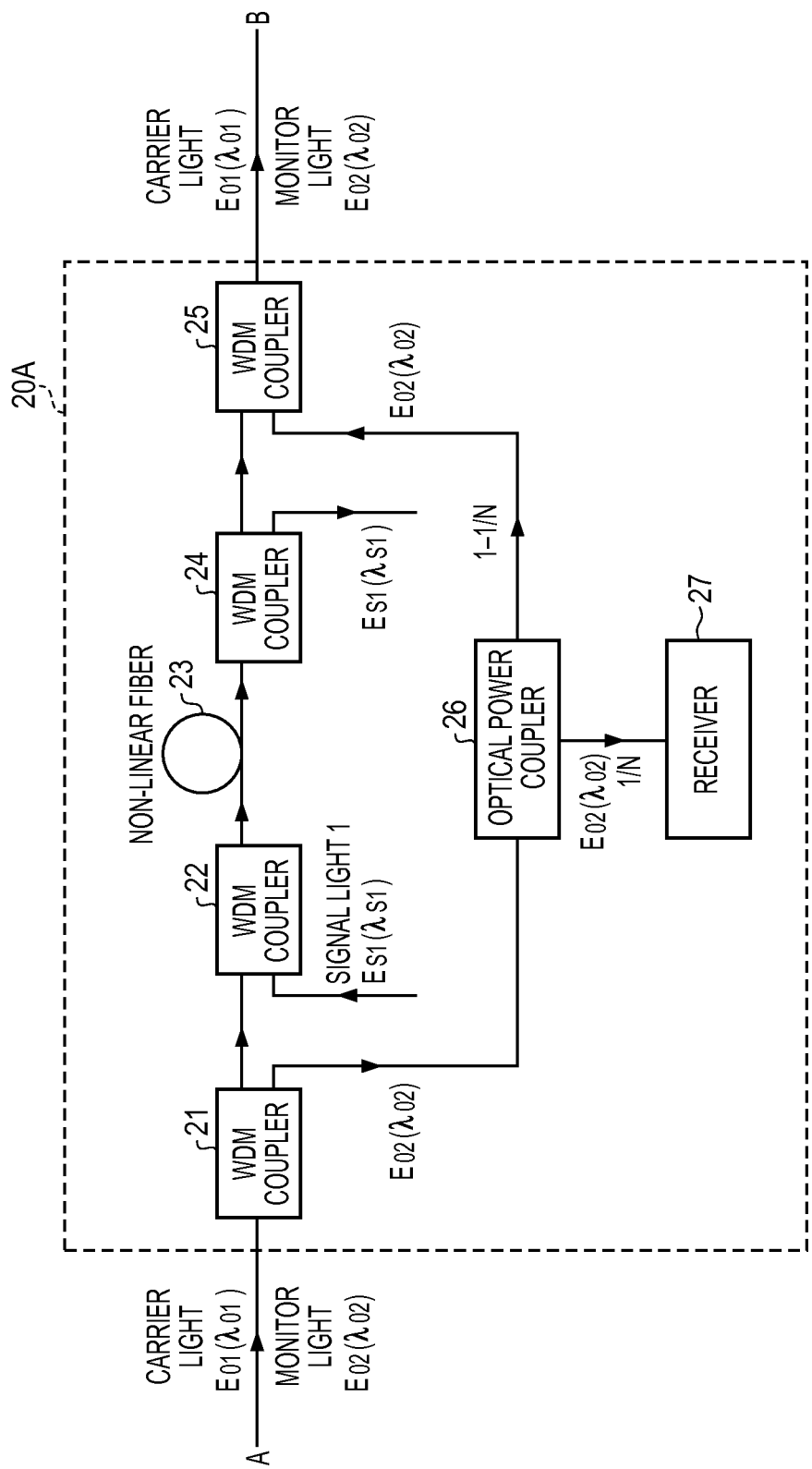
FIG. 4 is a configuration diagram of a third embodiment of an optical frequency-division multiplexer.

FIG. 4 is a configuration diagram of a third embodiment of an optical frequency-division multiplexer. In FIG. 4, the point A and the point B are connected to an optical network via an optical fiber, and the carrier light $E_{01}$ having the wavelength $\lambda_{01}$ and the monitor light $E_{02}$ having the wavelength $\lambda_{02}$ are propagated from the point A to the point B. In this case, the carrier light $E_{01}$ is used for writing a data signal from a mid-point between the point A and the point B. On the other hand, information (the data signal) has been written into the monitor light $E_{02}$ in advance and the monitor light $E_{02}$ is used for extracting the information at the mid-point between the point A and the point B and reading the information.

In an optical frequency-division multiplexer 20A, the carrier light $E_{01}$ and the monitor light $E_{02}$ are supplied to a WDM coupler 21 capable of demultiplexing the wavelength $\lambda_{01}$ and the wavelength $\lambda_{02}$ from each other, and the carrier light $E_{01}$ having the wavelength $\lambda_{01}$ split by the WDM coupler 21 is supplied to a WDM coupler 22. In the WDM coupler 22, the signal light $E_{S1}$ having a wavelength $\lambda_{S1}$ different from the wavelength $\lambda_{01}$ is coupled with the carrier light $E_{01}$. The signal light $E_{S1}$ is, for example, a signal light modulated by a sub-carrier modulated signal obtained by modulating a carrier having the frequency $f_1$ using the data signal $B_1$. An output light of the WDM coupler 22 is supplied to a non-linear fiber 23 serving as a phase modulator, and cross phase modulation (XPM) is applied to the carrier light $E_{01}$ using the signal light $E_{S1}$ in the non-linear fiber 23, thereby optical frequency division multiplexing the data signal $B_1$ with the carrier light $E_{01}$. An optical signal transmitted via the non-linear fiber 23 is supplied, after the signal light $E_{S1}$ is branched out from the optical signal in a WDM coupler 24, to a WDM coupler 25.

On the other hand, the monitor light $E_{02}$ split with the carrier light $E_{01}$ in the WDM coupler 21 is supplied to an optical power coupler 26. The optical power coupler 26 performs power branching on the monitor light $E_{02}$ such that only 1/N of the monitor light $E_{02}$ is branched out, and a receiver 27 receives the branched component to read a data signal. Remaining components $[1-(1/N)]$ of the monitor light $E_{02}$ are coupled with the carrier light $E_{01}$ by the optical coupler 25, and then, the resultant light is further propagated in the direction to the point B.

Figure 5:
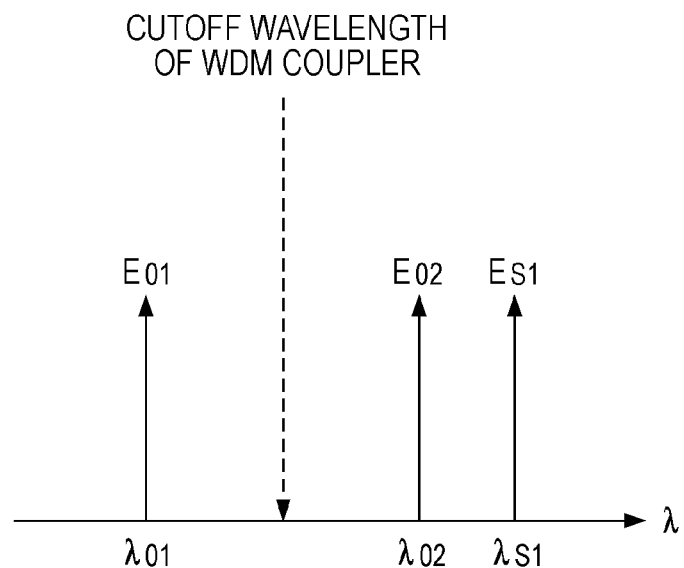
FIG. 5 is a diagram illustrating cutoff wavelength characteristics of a WDM coupler.

In this embodiment, the WDM couplers 21, 22, 24, and 25 are used for coupling and splitting of the carrier light $E_{01}$ and the monitor light $E_{02}$. As illustrated in FIG. 5, the wavelength of the carrier light $E_{01}$, and the wavelengths of the monitor light $E_{02}$ and the signal light $E_{S1}$ are set to be in different transmission bands of a WDM coupler. Specifically, the wavelengths of the monitor light $E_{02}$ and the signal light $E_{S1}$ are set so as to be arranged outside the transmission band of the carrier light $E_{01}$. In this case, the cutoff wavelength of each WDM coupler is set to be arranged between the wavelength $\lambda_{01}$ and the wavelength $\lambda_{02}$. Thus, the carrier light $E_{01}$ may receive optical modulation by a signal light with almost no loss, and then, the signal light $E_{S1}$ is split with the carrier light by the WDM coupler 24.

The monitor light $E_{02}$ is split with and coupled with the carrier light $E_{01}$ by the WDM couplers 21 and WDM coupler 25 while rarely affecting optical modulation of the carrier light $E_{01}$, and a part of power of the monitor light $E_{02}$ is tapped, i.e., branched out, so that a data signal may be effectively read. Note that the optical-multiplexed data signal is extracted in a band-pass optical filter and an electrical filter after photoelectric conversion, etc., and then, is detected.

Fourth Embodiment of Optical Frequency-Division Multiplexer (OMUX)

Figure 6:
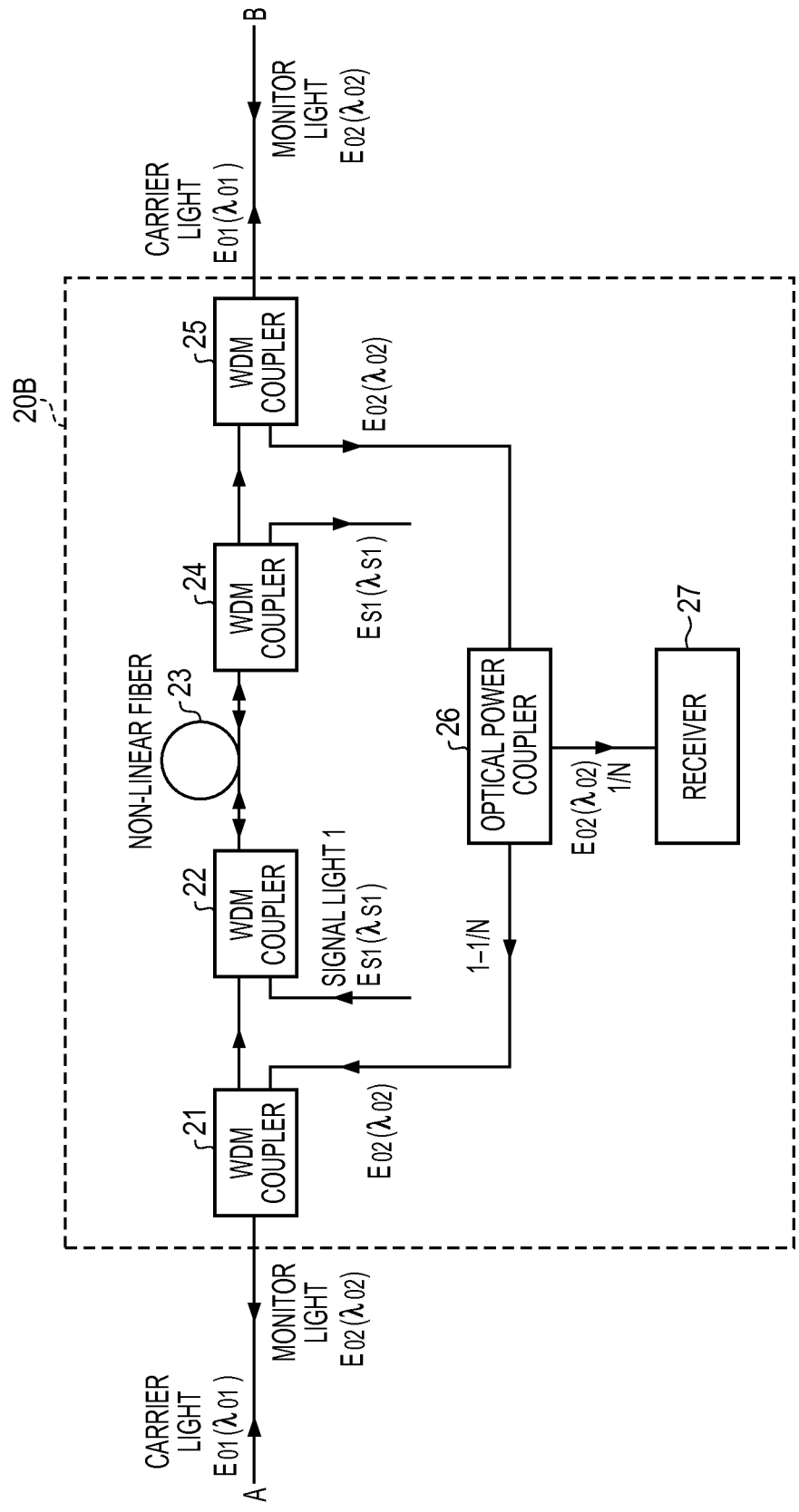
FIG. 6 is a configuration diagram of a fourth embodiment of an optical frequency-division multiplexer.

FIG. 6 is a configuration diagram of a fourth embodiment of an optical frequency-division multiplexer. In FIG. 6, the point A and the point B are connected to each other via an optical fiber, the carrier light $E_{01}$ having the wavelength $\lambda_{01}$ is propagated from the point A to the point B, and the monitor light $E_{02}$ having the wavelength $\lambda_{02}$ is propagated from the point B to the point A. In this case, the carrier light $E_{01}$ is used for writing a data signal from a mid-point between the point A and the point B. On the other hand, information (the data signal) has been written into the monitor light $E_{02}$ in advance and the monitor light $E_{02}$ is used for extracting the information at the mid-point between the point A and the point B and reading the information.

In an optical frequency-division multiplexer 20B, the carrier light $E_{01}$ and the monitor light $E_{02}$ are supplied to the WDM coupler 21 capable of demultiplexing the wavelength $\lambda_{01}$ and the wavelength $\lambda_{02}$ from each other, and the carrier light $E_{01}$ having the wavelength $\lambda_{01}$ split by the WDM coupler 21 is supplied to the WDM coupler 22. In the WDM coupler 22, the signal light $E_{S1}$ having the wavelength $\lambda_{S1}$ different from the wavelength $\lambda_{01}$ is coupled with the carrier light $E_{01}$. The signal light $E_{S1}$ is, for example, a signal light modulated by a sub-carrier modulated signal obtained by modulating a carrier having the frequency $f_1$ using the data signal $B_1$. An output light of the WDM coupler 22 is supplied to the non-linear fiber 23 serving as a phase modulator, and cross phase modulation is applied to the carrier light $E_{01}$ using the signal light $E_{S1}$ in the non-linear fiber 23, thereby optical frequency division multiplexing the data signal $B_1$ with the carrier light $E_{01}$. An optical signal transmitted via the non-linear fiber 23 is supplied, after the signal light $E_{S1}$ is branched out from the optical signal in the WDM coupler 24, to the WDM coupler 25.

On the other hand, the monitor light $E_{02}$ split with the carrier light $E_{01}$ by the WDM coupler 25 is supplied to the optical power coupler 26. The optical power coupler 26 performs power branching on the monitor light $E_{02}$ such that only 1/N of the monitor light $E_{02}$ is branched out, and the receiver 27 receives the branched component to read a data signal. Remaining components $[1-(1/N)]$ of the monitor light $E_{02}$ are coupled with the carrier light $E_{01}$ by the optical coupler 21, and then, the resultant light is further propagated in the direction to the point A.

Fifth Embodiment of Optical Frequency-Division Multiplexer (OMUX)

FIG. 7 is a configuration diagram of a fifth embodiment of an optical frequency-division multiplexer. In FIG. 7, the point A and the point B are connected to an optical network via an optical fiber, a carrier light $E_{011}$ having a wavelength $\lambda_{11}$ and a monitor light $E_{012}$ having a wavelength $\lambda_{012}$ are propagated from the point A to the point B, and a carrier light $E_{021}$ having a wavelength $\lambda_{021}$ and a monitor light $E_{022}$ having a wavelength $\lambda_{022}$ are propagated from the point B to the point A. In this case, the carrier lights $E_{on}$ and $E_{021}$ are used for writing a data signal from a mid-point between the point A and the point B. On the other hand, information (the data signal) has been written into the monitor lights $E_{012}$ and $E_{022}$ in advance and the monitor lights $E_{012}$ and $E_{022}$ are used for extracting the information at the mid-point between the point A and the point B and reading the information.

In an optical frequency-division multiplexer 20C, the carrier light $E_{011}$ and the monitor light $E_{012}$ are supplied to the WDM coupler 21 capable of demultiplexing the wavelength $\lambda_{11}$ and the wavelength $\lambda_{012}$ from each other, and the carrier light $E_{011}$ having the wavelength $\lambda_{11}$ split by the WDM coupler 21 is supplied to the WDM coupler 22. In the WDM coupler 22, the signal light $E_{S1}$ having the wavelength $\lambda_{S1}$ different from the wavelength $\lambda_{11}$ which is closer to a circulator 28 is coupled with the carrier light $E_{011}$. The signal light $E_{S1}$ is, for example, a signal light modulated by a sub-carrier modulated signal obtained by modulating a carrier having the frequency $f_{11}$ using the data signal $B_1$. An output light of the WDM coupler 22 is supplied to the non-linear fiber 23 serving as a phase modulator, and cross phase modulation is applied to the carrier light $E_{011}$ using the signal light $E_{S1}$ in the non-linear fiber 23, thereby optical frequency division multiplexing the data signal $B_1$ with the carrier light $E_{011}$. An optical signal transmitted via the non-linear fiber 23 is supplied, after the signal light $E_{S1}$ is branched out from the optical signal in the WDM coupler 24, to the WDM coupler 25.

On the other hand, the monitor light $E_{012}$ split with the carrier light $E_{011}$ in the WDM coupler 21 is supplied to the optical power coupler 26. The optical power coupler 26 performs power branching on the monitor light $E_{012}$ such that only 1/N of the monitor light $E_{012}$ is branched out, and the receiver 27 receives the branched component to read a data signal. Remaining components $[1-(1/N)]$ of the monitor light $E_{012}$ are coupled with the carrier light $E_{E011}$ and the like by the optical coupler 25, and then, the resultant light is further propagated in the direction to the point B.

The carrier light $E_{021}$ and the monitor light $E_{022}$ are supplied to the WDM coupler 25 capable of demultiplexing the wavelength $\lambda_{021}$ and the wavelength $\lambda_{022}$ from each other, and the carrier light $E_{021}$ having the wavelength $\lambda_{021}$ split by the WDM coupler 25 is supplied to the WDM coupler 24. In the WDM coupler 24, a signal light $E_{s2}$ having a wavelength $\lambda_{s2}$ different from the wavelength $\lambda_{021}$ which is closer to a circulator 29 is coupled with the carrier light $E_{021}$. The signal light $E_{S2}$ is, for example, a signal light modulated by a sub-carrier modulated signal obtained by modulating a carrier having a frequency $f_{21}$ using a data signal $B_2$. An output light of the WDM coupler 24 is supplied to the non-linear fiber 23 serving as a phase modulator, and cross phase modulation is applied to the carrier light $E_{021}$ using the signal light $E_{S2}$ in the non-linear fiber 23, thereby optical frequency division multiplexing the data signal $B_2$ with the carrier light $E_{021}$. An optical signal transmitted via the non-linear fiber 23 is supplied, after the signal light $E_{S1}$ is branched out from the optical signal in the WDM coupler 22, to the WDM coupler 21.

On the other hand, the monitor light $E_{022}$ split with the carrier light $E_{021}$ in the WDM coupler 21 is supplied to the optical power coupler 26. The optical power coupler 26 performs power branching on the monitor light $E_{022}$ such that only 1/N of the monitor light $E_{022}$ is branched out, and the receiver 27 receives the branched component to read a data signal. Remaining components $[1-(1/N)]$ of the monitor light $E_{022}$ are coupled with the carrier light $E_{021}$ and the like by the optical coupler 21, and then, the resultant light is further propagated in the direction to the point A.

Cutoff Wavelength Characteristics of WDM Coupler

The WDM couplers 21, 22, 24, and 25 for coupling and splitting are provided at input and output ends of the non-linear fiber 23, the wavelength $\lambda_{011}$ of the carrier light $E_{011}$ and the wavelength $\lambda_{021}$ of the carrier light $E_{021}$ are arranged in the same transmission band of a WDM coupler, and the wavelength $\lambda_{S1}$ of the signal light $E_{S1}$, the wavelength $\lambda_{S2}$ of the signal light $E_{S2}$, the wavelength $\lambda_{012}$ of the monitor light $E_{012}$, and the wavelength $\lambda_{022}$ of the monitor light $E_{022}$ are set to be in a different transmission band of the WDM coupler. Specifically, the wavelengths of the signal lights and the monitor lights are set to be arranged outside the transmission band of the carrier lights.

Figure 8A:
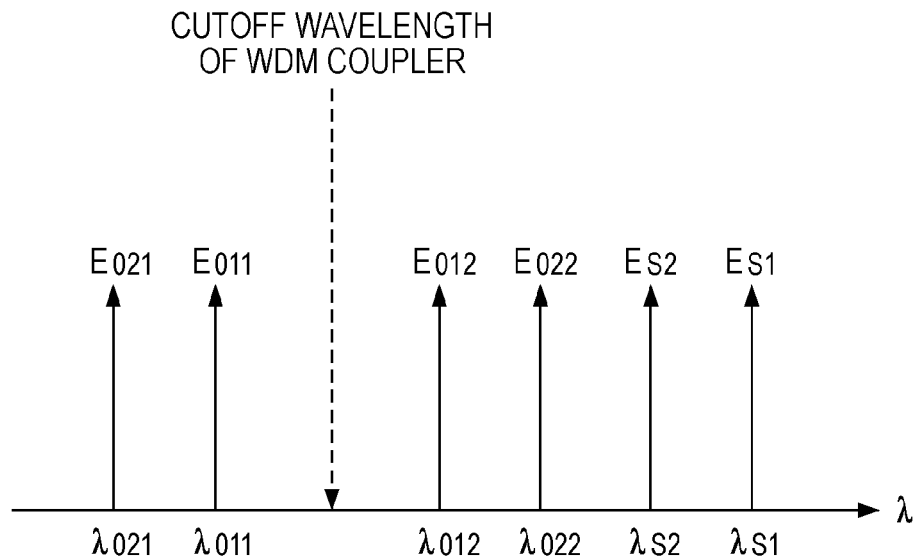
FIGS. 8A and 8B are diagrams illustrating cutoff wavelength characteristics of WDM couplers.
Figure 8B:
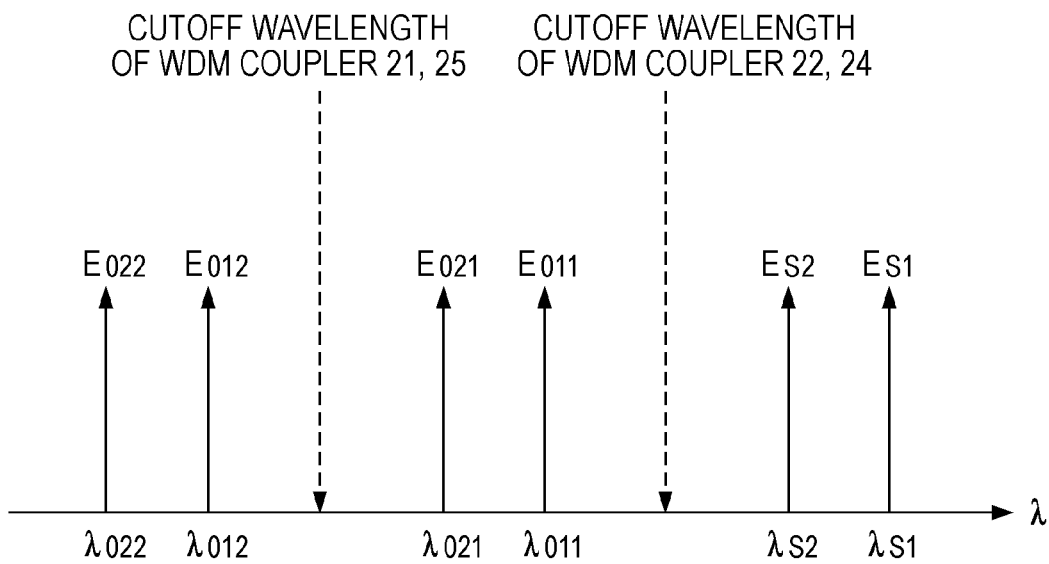

FIG. 8A illustrates an example where respective cutoff wavelengths of the WDM couplers 21, 22, 24, and 25 are set to be substantially the same and the wavelengths of the carrier lights $E_{011}$ and $E_{021}$ are demultiplexed from the wavelengths of the monitor lights $E_{012}$ and $E_{022}$. FIG. 8B illustrates an example where the cutoff wavelength of the WDM couplers 21 and 25 and the cutoff wavelength of the WDM couplers 22 and 24 are arranged distant from each other, the carrier lights $E_{011}$ and $E_{021}$ are split with the monitor lights $E_{012}$ and $E_{022}$ by the WDM couplers 21 and 25, and the carrier lights $E_{011}$ and $E_{021}$ are split with the signal lights $E_{S1}$ and $E_{S2}$ by the WDM couplers 22 and 24. In this case, each of the carrier lights $E_{011}$ and $E_{021}$ may receive optical phase modulation by a signal light with almost no loss and, after the signals are optical-multiplexed on the carrier light, the signal lights and the monitor lights are split with the carrier light.

First Embodiment of Optical Communication System

FIG. 9 is a configuration diagram of a first embodiment of an optical communication system. In FIG. 9, the optical frequency-division multiplexers 20A of FIG. 4 are arranged at different points, and thus, information provided at each point is optical frequency division multiplexed with a carrier light. In this case, a frequency specific to each point is assigned to information provided at the point.

In FIG. 9, a terminal 30A and a terminal 30B are connected to each other via an optical fiber, and the carrier light $E_{01}$ having the wavelength $\lambda_{01}$ and the monitor light $E_{02}$ having the wavelength $\lambda_{02}$ are propagated in the direction from the terminal 30A to the terminal 30B. N optical frequency-division multiplexers 31-1 to 31-N having the same configuration as that of the optical frequency-division multiplexer 20A of FIG. 4 are arranged between the terminal 30A and the terminal 30B to form an optical network. The carrier light $E_{01}$ propagated in the direction from the terminal 30A to the terminal 30B is optically modulated through cross phase modulation using a signal light $E_{S1j}$ having a wavelength $\lambda_{S1j}$ (j is an integer from 1 to N). The signal light $E_{S1j}$ is, for example, a signal light modulated by a sub-carrier modulated signal obtained by modulating a carrier having a frequency $f_{1j}$ using a data signal $B_{1j}$.

The monitor light $E_{02}$ is demultiplexed such that 1/N of power of the monitor light $E_{02}$ is branched out in each of the optical frequency-division multiplexers 31-1 to 31-N, and a monitor signal, i.e., a data signal, is detected. The propagated carrier light $E_{01}$ and monitor light $E_{02}$ are detected as signals in the terminal 30B.

Second Embodiment of Optical Communication System

Figure 10:
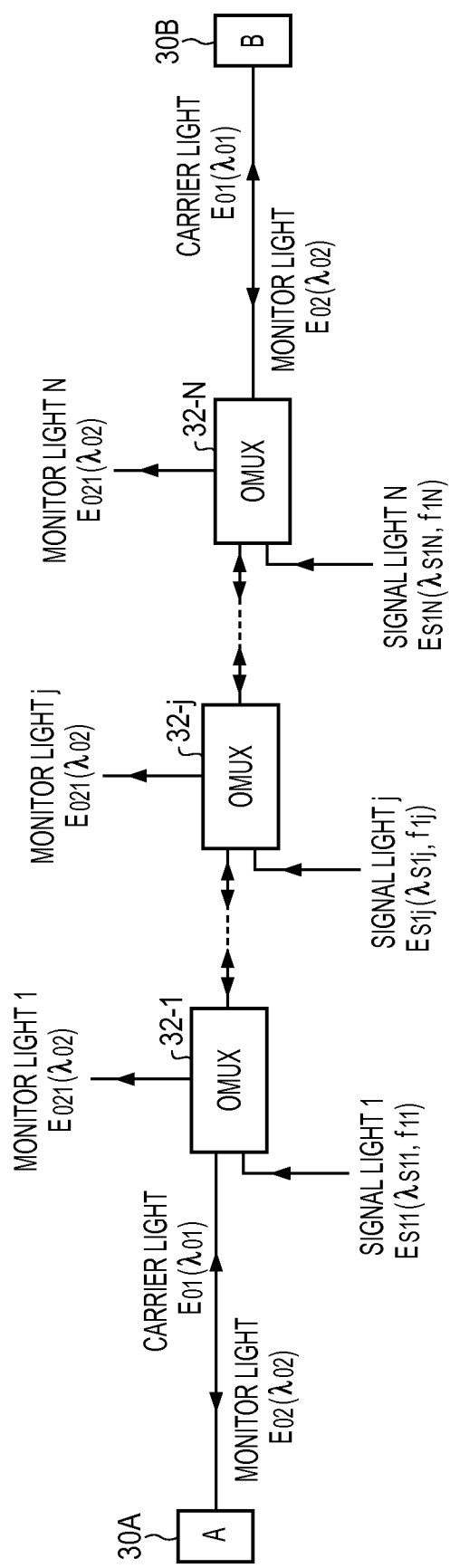
FIG. 10 is a configuration diagram of a second embodiment of an optical communication system.

FIG. 10 is a configuration diagram of a second embodiment of an optical communication system. In FIG. 10, the optical frequency-division multiplexers 20B of FIG. 6 are arranged at different points, and thus, information provided at each point is optical frequency division multiplexed with a carrier light. In this case, a frequency specific to each point is assigned to the information provided at the point.

In FIG. 10, the terminal 30A and the terminal 30B are connected to each other via an optical fiber, and the carrier light $E_{01}$ having the wavelength $\lambda_{01}$ is propagated in the direction from the terminal 30A to the terminal 30B and the monitor light $E_{02}$ having the wavelength $\lambda_{02}$ is propagated in the direction from the terminal 30B to the terminal 30A. N optical frequency-division multiplexers 32-1 to 32-N having the same configuration as that of the optical frequency-division multiplexer 20B of FIG. 6 are arranged between the terminal 30A and the terminal 30B. The carrier light $E_{01}$ propagated in the direction from the terminal 30A to the terminal 30B is optically modulated through cross phase modulation using the signal light $E_{S1j}$ having the wavelength $\lambda_{S1j}$ (j is an integer from 1 to N). The signal light $E_{S1j}$ is, for example, a signal light modulated by a sub-carrier modulated signal obtained by modulating a carrier having the frequency using the data signal $B_{1j}$.

The monitor light $E_{02}$ is demultiplexed such that 1/N of power of the monitor light $E_{02}$ is branched out in each of the optical frequency-division multiplexers 32-1 to 32-N, and a monitor signal, i.e., a data signal, is detected. The propagated carrier light $E_{01}$ is detected as a signal at the terminal 30B, and the propagated monitor light $E_{02}$ is detected as a signal in the terminal 30A.

Third Embodiment of Optical Communication System

Figure 11:
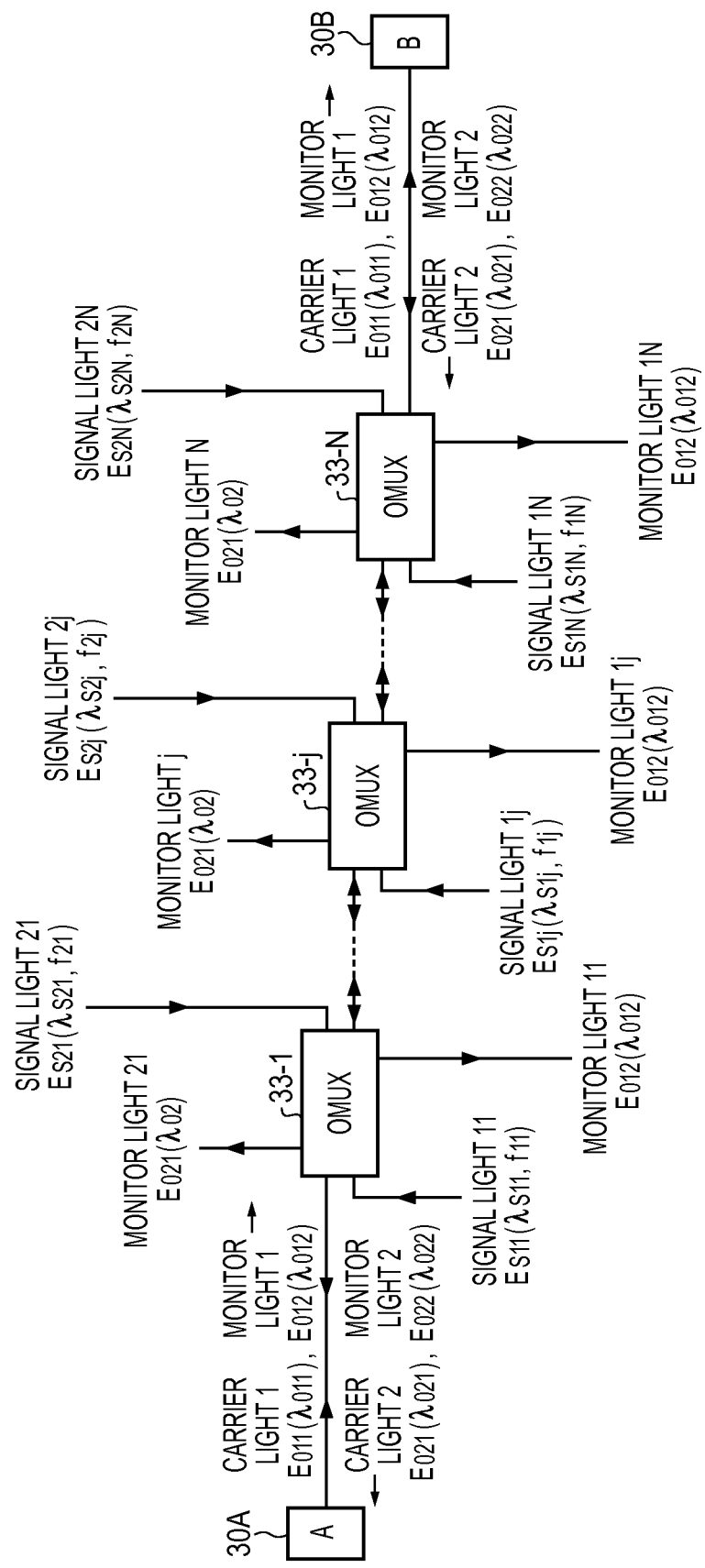
FIG. 11 is a configuration diagram of a third embodiment of an optical communication system.

FIG. 11 is a configuration diagram of a third embodiment of an optical communication system. In FIG. 11, the optical frequency-division multiplexers 20C of FIG. 7 are arranged at different points, and thus, information provided at each point is optical frequency division multiplexed with a carrier light. In this case, a frequency specific to each point is assigned to information provided at the point.

In FIG. 11, the terminal 30A and the terminal 30B are connected to each other via an optical fiber, and the carrier light $E_{011}$ having the wavelength $\lambda_{11}$ and the monitor light $E_{012}$ having the wavelength $\lambda_{012}$ are propagated in the direction from the terminal 30A to the terminal 30B. The carrier light $E_{021}$ having the wavelength $\lambda_{021}$ and the monitor light $E_{022}$ having the wavelength $\lambda_{022}$ are propagated in the direction from the terminal 30B to the terminal 30A.

N optical frequency-division multiplexers 33-1 to 33-N having the same configuration as that of the optical frequency-division multiplexer 20C of FIG. 7 are arranged between the terminal 30A and the terminal 30B. The carrier light $E_{011}$ propagated in the direction from the terminal 30A to the terminal 30B is optically modulated through cross phase modulation using the signal light $E_{S1j}$ having the wavelength $\lambda_{S1j}$ (j is an integer from 1 to N). The signal light $E_{S1j}$ is, for example, a signal light modulated by a sub-carrier modulated signal obtained by modulating a carrier having the frequency $f_{1j}$ using the data signal $B_{1j}$. Similarly, the carrier light $E_{021}$ propagated in the direction from the terminal 30B to the terminal 30A is optically modulated through cross phase modulation using a signal light $E_{S2j}$ having a wavelength $\lambda_{S2j}$ (j is an integer from 1 to N). The signal light $E_{S2j}$ is, for example, a signal light modulated by a sub-carrier modulated signal obtained by modulating a carrier having a frequency $f_{2j}$ using a data signal $B_{2j}$.

The monitor light $E_{012}$ is demultiplexed such that 1/N of power of the monitor light $E_{012}$ is branched out in each of the optical frequency-division multiplexers 33-1 to 33-N, and a monitor signal, i.e., a data signal, is detected. The carrier light $E_{011}$ and the monitor light $E_{012}$ which are propagated are detected as signals in the terminal 30B. Similarly, the monitor light $E_{022}$ is split such that 1/N of power of the monitor light $E_{022}$ is branched out in each of the optical frequency-division multiplexers 33-N to 33-1, and a monitor signal, i.e., a data signal, is detected. The propagated carrier light $E_{021}$ and monitor light $E_{022}$ are detected as signals in the terminal 30A.

Fourth Embodiment of Optical Communication System

Note that, in each of the first to third embodiments, the configuration in which an optical signal is propagated between the terminal 30A and the terminal 30B using a single optical fiber has been described. However, in each of the above-described embodiments, a configuration in which an optical signal is propagated between the terminal 30A and the terminal 30B using a plurality of optical fibers is applicable.

Figure 12:
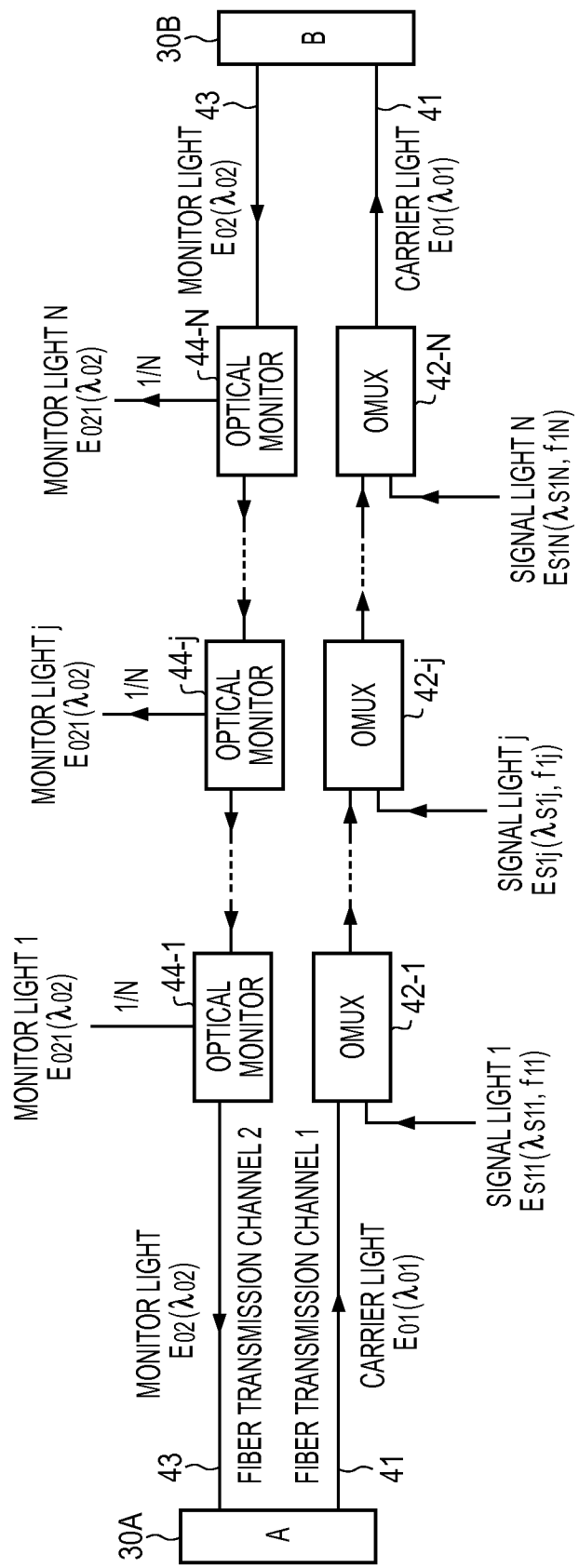
FIG. 12 is a configuration diagram of a fourth embodiment of an optical communication system.

A fourth embodiment of an optical communication system illustrated in FIG. 12 has a configuration in which the operation of the embodiment illustrated in FIG. 10 is realized using two optical fibers. In this case, the carrier light $E_{01}$ having the wavelength $\lambda_{01}$ is propagated in the direction from the terminal 30A to the terminal 30B via an optical fiber 41, and the data signal is optical frequency division multiplexed in N optical frequency-division multiplexers 42-1 to 42-N arranged between the terminal 30A and the terminal 30B and each having the same configuration as that of the optical frequency-division multiplexer 20B.

On the other hand, the monitor light $E_{02}$ having the wavelength $\lambda_{02}$ is propagated in the direction from the terminal 30B to the terminal 30A via an optical fiber 43, power branching is performed such that only 1/N of the monitor light $E_{02}$ is branched out and a monitor light is detected in N optical frequency-division multiplexers 44-N to 44-1 arranged between the terminal 30B and the terminal 30A and each having the same configuration as that of the optical frequency-division multiplexer 20B, and a monitor light is detected.

In this case, the optical frequency-division multiplexers 42-1 to 42-N may have only an optical add multiplexing function, and the optical frequency-division multiplexers 44-1 to 44-N may have only an optical monitoring function. Each of the optical frequency-division multiplexers 42-1 to 42-N and a corresponding one of the optical frequency-division multiplexers 44-1 to 44-N may be arranged at the same point, and may also be arranged different points.

Embodiments of Optical Modulator

In each of the above-described embodiments, as the modulation scheme for the data signal $B_j$, various methods such as amplitude modulation, phase modulation, frequency modulation, multilevel modulation or orthogonal frequency division multiplexing (OFDM) of these, and quadrature amplitude modulation (QAM), etc. are applicable.

Figure 13:
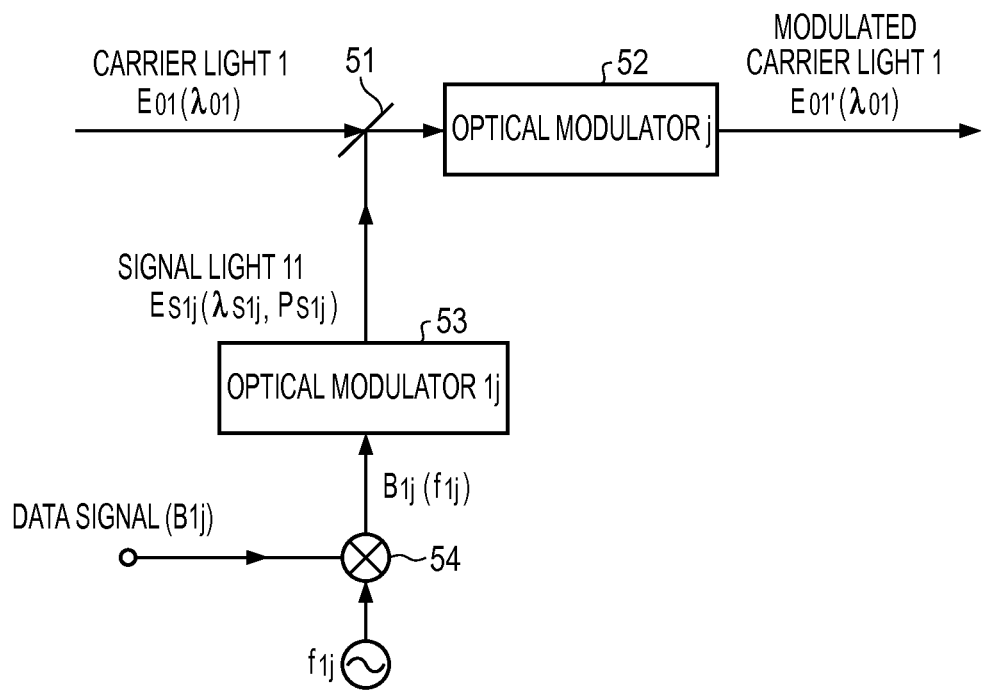
FIG. 13 is a configuration diagram of a first embodiment of an optical modulator.

FIG. 13 is a configuration diagram of a first embodiment of an optical modulator. In FIG. 13, a configuration of a jth optical modulator for the carrier light $E_{01}$ is illustrated. The carrier light $E_{01}$ and the signal light $E_{S1j}$ are coupled by a multiplexer 51 and are received by an optical modulator 52, optical modulation using the signal light $E_{S1j}$ is applied to the carrier light $E_{01}$, the data signal $B_{1j}$ of the signal light $E_{S1j}$ is optical frequency division multiplexed with the carrier light $E_{01}$, and the resultant light is outputted. The carrier light $E_{01}$ receives cross phase modulation (XPM) by the signal light $E_{S1j}$ to be optical phase modulated in the optical modulator 52. In this case, the signal light $E_{S1j}$ is a light modulated by an optical modulator 53 using a sub-carrier modulation signal $B_{1j}(f_{1j})$ obtained by multiplying carrier at frequency $f_{1j}$ by the data signal $B_{1j}$ in a multiplier 54, in other words, the sub-carrier modulation signal $B_{1j}(f_{1j})$ obtained by modulating a frequency carrier having the frequency by the data signal $B_{1j}$.

Figure 14:
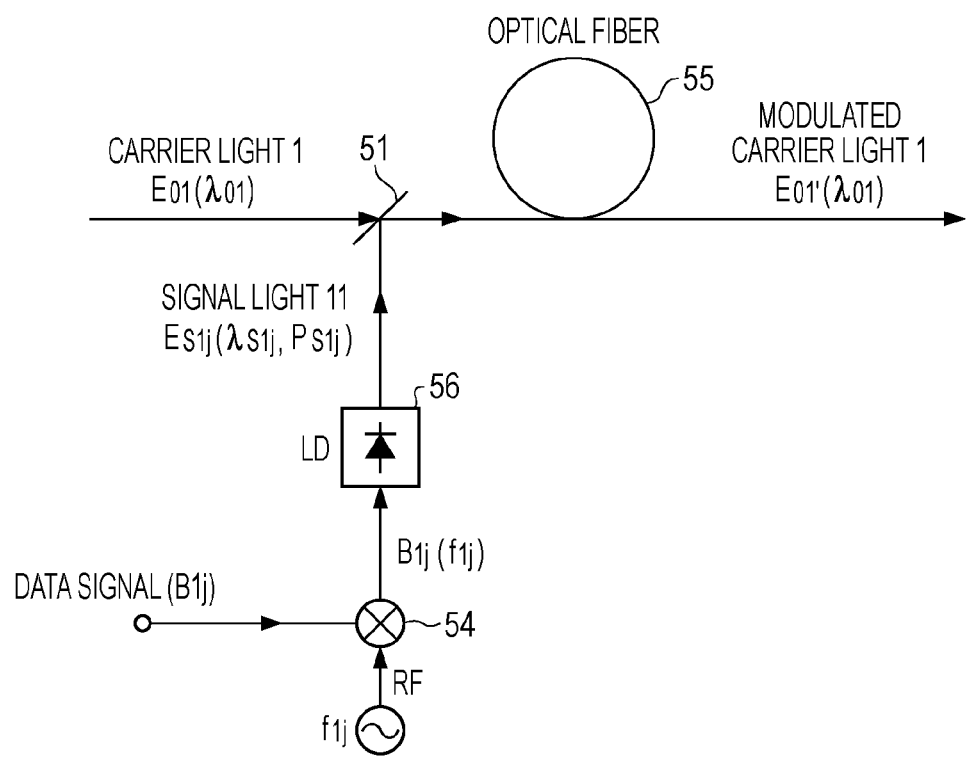
FIG. 14 is a configuration diagram of a second embodiment of an optical modulator.

FIG. 14 is a configuration diagram of a second embodiment of an optical modulator. This embodiment uses an optical fiber 55 and a laser diode (LD) 56 as the optical modulator 52 and the optical modulator 53 of FIG. 13, respectively. In this case, the laser diode 56 in which a drive current is modulated by the sub-carrier modulated signal $B_{1j}(f_{1j})$ outputs the signal light $E_{S1j}$ amplitude-modulated. Next, the signal light $E_{S1j}$ is coupled with the carrier light $E_{01}$ by the multiplexer 51, and then, is received by the optical fiber 55. The carrier light $E_{01}$ receives optical phase modulation in proportion to power $P_{S1j}$ of the signal light $E_{S1j}$ by cross phase modulation generated in the optical fiber 55 and is outputted as modulated carrier light $E_{01}$. Through this cross phase modulation, the data signal $B_{1j}$ is optical frequency division multiplexed with the frequency separation of $f_{1j}$ from the center frequency of the carrier light $E_{01}$.

Figure 15:
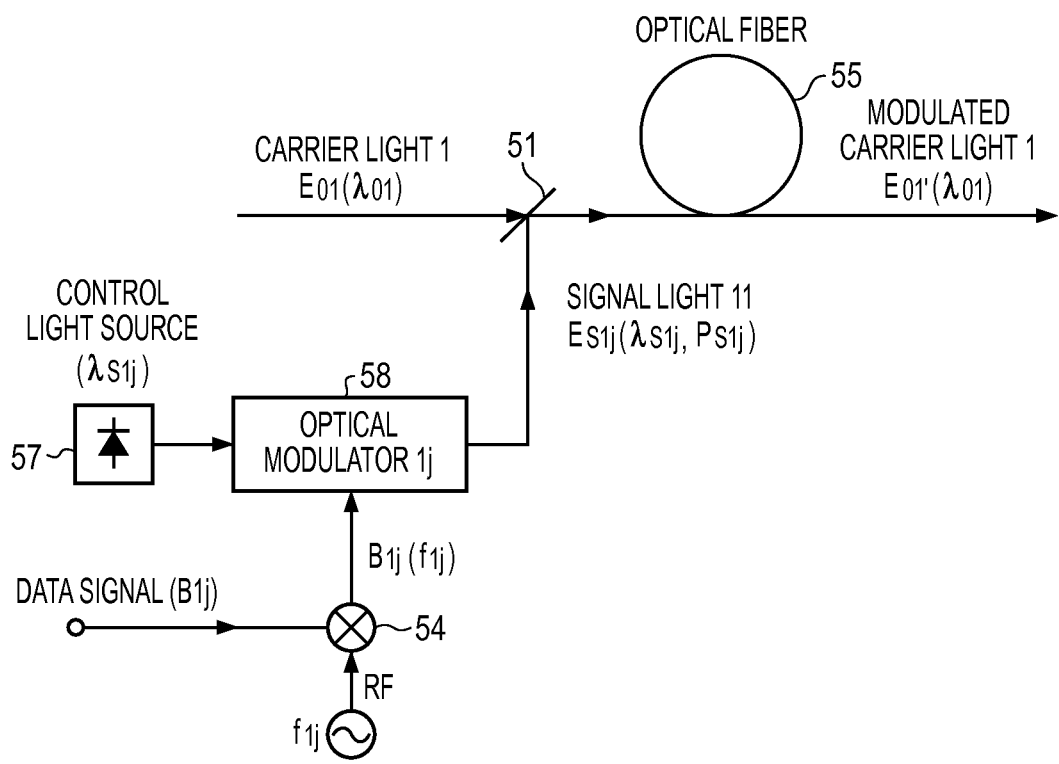
FIG. 15 is a configuration diagram of a third embodiment of an optical modulator.

In the second embodiment of an optical phase modulator, a case where the laser diode 56 is directly modulated using the sub-carrier modulated signal has been described. When modulation is performed by a sub-carrier modulated signal $B_{1j}(f_{1j})$ having a higher carrier frequency (an RF frequency), an external optical modulator may be used as illustrated in FIG. 15. FIG. 15 is a configuration diagram of a third embodiment of an optical phase modulator. In FIG. 15, a laser diode 57 serving as a control light source generates an optical wave having the wavelength $\lambda_{S1j}$ and supplies the optical wave to an optical modulator 58. The optical modulator 58 amplitude-modulates a control light having the wavelength $\lambda_{S1j}$ using the sub-carrier modulated signal $B_{1j}(f_{1j})$ and outputs the signal light $E_{S1j}$.

Note that the above-described optical phase modulation may be performed using a beat frequency (fa-fb) of two optical waves having different wavelengths (frequencies fa, fb) as a sub-carrier frequency.

Note that the polarization state of the signal light $E_{S1j}$ and the polarization state of the carrier light $E_{01}$ are adjusted so that desired optical phase modulation may be obtained, and are inputted to an optical coupler. For example, the polarization state of the signal light $E_{S1j}$ is matched to the polarization state of the carrier light $E_{01}$ using a polarization controller. As another alternative, a polarization diversity scheme in which optical phase modulation is performed on every two orthogonal polarized waves at approximately the same modulation degree may be used.

Note that, as compared to the case where the polarization states of the signal light $E_{S1j}$ and the carrier light $E_{01}$ match each other, the modulation degree of cross phase modulation is reduced when the polarization states of the signal light $E_{S1j}$ and the carrier light $E_{01}$ are orthogonal to each other. However, as will be described later, a method in which conversion to electrical signals is performed in a receiver, and then, a difference in the modulation degree is compensated using an electric circuit or an electric processing apparatus is also effective.

Embodiments of Receiver

Figure 16:
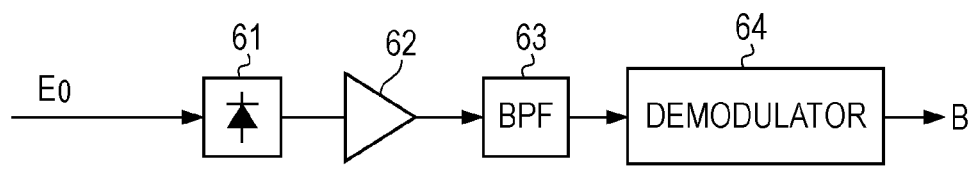
FIG. 16 is a configuration diagram of a first embodiment of a receiver.

FIG. 16 is a configuration diagram of a first embodiment of a receiver built in each of the terminals 30A and 30B. Each of the receivers 16 and 27 has the same configuration as that of FIG. 16. In FIG. 16, the receiver includes a photoreceiver 61, an amplifier 62, a band pass filter (BPF) 63, and a demodulator 64.

For example, carrier light $E_0$ is received by the photoreceiver 61 such as a photodiode (PD) or the like and is converted to an electrical signal, and a sub-carrier multiplexed signal $\Sigma B_j(f_j)$ is outputted from the photoreceiver 61. The sub-carrier multiplexed signal $\Sigma B_j(f_j)$ outputted from the photoreceiver 61 is amplified by the amplifier 62, and then, is filtered by the band pass filter 63 which passes a sub-carrier modulated signal. Examples of the demodulator 64 include an envelope detector, a square-law detector, and a phase detector, etc., and a demodulation scheme suitable to a modulation scheme used for modulating a data signal is appropriately employed. For example, for an OFDM signal, a digital signal processing circuit and a digital-to-analog and analog-to-digital (DAC and ADC) conversion circuit are used. Thus, the receiver may demodulate the data signal $B_j(f_j)$ which has been sub-carrier modulated from a carrier light.

Figure 17:
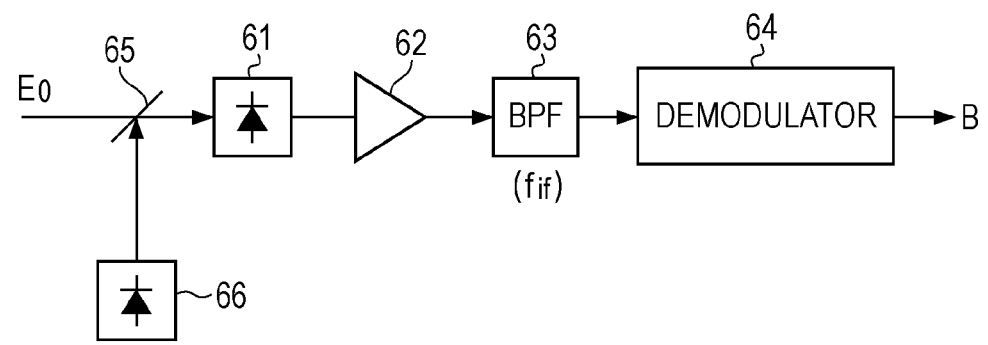
FIG. 17 is a configuration diagram of a variation of the first embodiment of a receiver.

FIG. 17 is a configuration diagram of a variation of the first embodiment of the receiver. In FIG. 17, in a multiplexer 65, a local light from a laser diode 66 which is a local oscillator is coupled with the carrier light $E_0$ and is received by the photoreceiver 61. The frequency (wavelength) of the local light is different from the frequency (wavelength) of a signal light by an amount corresponding to a predetermined frequency ($f_{if}$). Thus, an electrical signal having an intermediate frequency band ($f_{if}$) may be obtained from the photoreceiver 61.

In addition, a digital signal processing circuit which detects an error of modulated information and reduces a fluctuation and the like may be provided in a part of the receiver. In particular, a method in which homodyne detection is performed with $f_{if}=0$ set to perform digital signal processing is also effective. Moreover, an optical band pass filter and a dispersing medium may be appropriately arranged at an input end of the receiver of each of FIG. 16 and FIG. 17 to establish a reception state at an optimal sensitivity.

As the non-linear fiber 23, a highly-nonlinear fiber (HNLF), or a fiber or a waveguide configuration in which a non-linear refractive index of a core is increased by doping the core with germanium or bismuth, etc. may be employed. Also, a fiber in which a mode filed is reduced to enhance the optical power density, a waveguide configuration, a fiber using chalcogenide glass, or a photonic crystal fiber, etc., may be employed.

As a non-linear optical medium alternative to the non-linear fiber 23, a semiconductor optical amplifier having a quantum well structure, a quantum dot semiconductor optical amplifier, or a silicon photonics type waveguide, etc. may be used. Furthermore, as another non-linear optical medium, a device which generates the second-order non-linear optical effect such as three-wave mixing or difference frequency generation may be used. In this case, for example, a $LiNbO_3$ waveguide (periodically poled lithium niobate or PPLN), a GaAlAs device, or a second-order non-linear optical crystal, etc., each having a quasi phase matching, may be used as the above-described device. Even when a second-order non-linear medium is used, a configuration in which wavelengths are arranged to achieve phase matching is preferable.

Furthermore, in this embodiment, when a carrier light is subjected to wavelength division multiplexing (WDM), signals may be collectively multiplexed with a WDM carrier light. Accordingly, with the carrier light passing through a network, new information may be multiplexed into the network in real time. Due to this effect, a non-linear fiber is arranged at each point j, and a WDM coupler for coupling and splitting a signal light is arranged at each input and output end thereof, thus realizing signal multiplexing to the carrier light.

Figure 18:
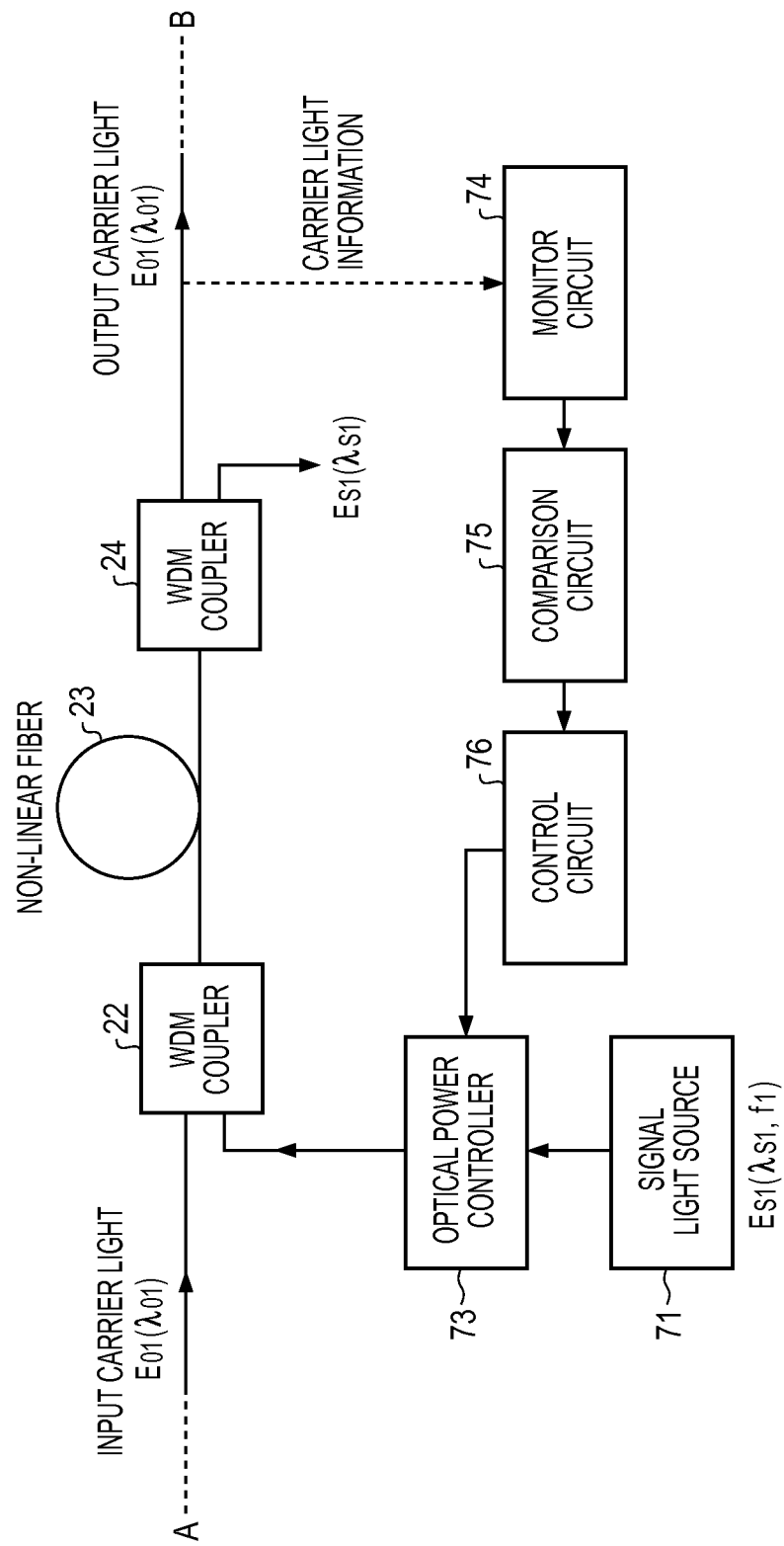
FIG. 18 is a configuration diagram of an embodiment of an optical modulation control system for carrier light.

FIG. 18 is a configuration diagram of an embodiment of an optical phase modulation control system for a carrier light in an optical frequency-division multiplexer. In FIG. 18, the signal light $E_{S1}$ having the wavelength $\lambda_{S1}$ outputted from a signal light source 71 is supplied to the WDM coupler 22 via an optical power controller 73 and is coupled with the carrier light $E_{01}$ having the wavelength $\lambda_{01}$. An output light of the WDM coupler 22 is supplied to the non-linear fiber 23, and cross phase modulation is performed on the carrier light $E_{01}$ by the signal light $E_{S1}$ in the non-linear fiber 23, thereby optical frequency division multiplexing the data signal $B_1$ with the carrier light $E_{01}$. An optical signal which has passed through the non-linear fiber 23 is subjected to branching such that the signal light $E_{S1}$ is branched out in the WDM coupler 24, and then, is outputted.

A monitor circuit 74 monitors the quality of the output carrier light $E_{01}$. Note that the monitor circuit 74 includes an optical filter that extracts a carrier light and a light receiving element that receives a carrier light. As the quality of the output carrier light $E_{01}$, for example, optical power of the output carrier light $E_{O1}$ is monitored, and other than the optical power, the wavelength thereof or the spectrum thereof, etc. may be monitored. A comparison circuit 75 calculates, on the basis of the optical power of the carrier light $E_{O1}$ detected in the monitor circuit 74, an operation characteristic of optical phase modulation, compares the optical power with a predetermined threshold power held in the comparison circuit 75, and supplies, for example, a comparison result such as a difference between the optical power and the threshold power of the carrier light to the optical power controller 73. The optical power controller 73 controls, on the basis of the comparison result, the optical power and polarization state, etc. of the signal light $E_{S1}$, for example, such that the value of the optical power of the carrier light $E_{O1}$ is constant.

According to the above-described embodiments, without performing electric conversion of an optical signal, information existing at each point in an optical network may be multiplexed with a carrier light and propagated, and propagated monitor information may be received at each point. Therefore, the present disclosure is effective in realizing power conserving, flexible optical signal multiplexing in an optical network.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An optical frequency-division multiplexer comprising:
a first optical coupler configured to receive at a first input output point a first wavelength-division multiplexed light obtained by wavelength-division multiplexing a first carrier light and a first monitor light and to split the first carrier light and the first monitor light from each other;
an optical modulator configured to optically modulate the first carrier light from the first optical coupler using a signal including a first data signal so as to multiplex the first data signal with the first carrier light;
an optical power coupler configured to receive the first monitor light from the first optical coupler and to split the first monitor light into a first and a second part of the first monitor light;
a receiver configured to receive the first part of the first monitor light and to demodulate a second data signal from the first part of the first monitor light; and
a second optical coupler configured to couple the second part of the first monitor light and the first carrier light with which the first data signal has been multiplexed and to transmit the coupled light from a second input output point to an optical network.

2. An optical frequency-division multiplexer comprising:
an optical modulator configured to optically modulate a first carrier light from a first optical coupler using a signal including a first data signal so as to multiplex the first data signal with the first carrier light;
a second optical coupler configured to supply the first data signal multiplexed with the first carrier light to a second input output point, to receive a first monitor light from the second input output point to split the first data signal multiplexed with the first carrier light and the first monitor light;
an optical power coupler configured to receive the first monitor light from the second optical coupler and to split the first monitor light into a first and second part of the first monitor light;
a receiver configured to receive the first part of the first monitor light and to demodulate a second data signal from the first part of the first monitor light, and
wherein the first optical coupler is configured to supply the second part of the first monitor light to a first input output point, to receive the first carrier light from the first input output point, and to transmit the first monitor light to an optical network.

3. The optical frequency-division multiplexer according to claim 1, wherein:
the second optical coupler receives a second wavelength-division multiplexed light obtained by wavelength-division multiplexing a second carrier light and a second monitor light having wavelengths different from wavelengths of the first carrier light and the first monitor light and supplied from the second input output point,
the optical modulator further optically modulates the second carrier light split by the second optical coupler using a signal including a third data signal so as to multiplex the third data signal with the second carrier light,
the receiver further receives a branched part of the second monitor light split by the second optical coupler and demodulates a fourth data signal from the second monitor light, and
the first optical coupler couples a remaining part of the second monitor light split by the second optical coupler and the carrier light with which the third data signal has been multiplexed and transmits the coupled light to the optical network from the first input output point.

4. The optical frequency-division multiplexer according to claim 1, wherein the optical modulator includes a non-linear optical medium that receives at least one of the first carrier light and a second carrier light and at least one of a first signal light and a second signal light having different wavelengths from wavelengths of the first carrier light and the second carrier light, multiplexes the first data signal included in the first signal light with the first carrier light through cross phase modulation, and multiplexes the third data signal included in the second signal light with the second carrier light.

5. The optical frequency-division multiplexer according to claim 2, wherein the optical modulator includes a non-linear optical medium that receives at least one of the first carrier light and a second carrier light and at least one of a first signal light and a second signal light having different wavelengths from wavelengths of the first carrier light and the second carrier light, multiplexes the first data signal included in the first signal light with the first carrier light through cross phase modulation, and multiplexes the third data signal included in the second signal light with the second carrier light.

6. The optical frequency-division multiplexer according to claim 3, wherein the optical modulator includes a non-linear optical medium that receives at least one of the first carrier light and the second carrier light and at least one of a first signal light and a second signal light having different wavelengths from wavelengths of the first carrier light and the second carrier light, multiplexes the first data signal included in the first signal light with the first carrier light through cross phase modulation, and multiplexes the third data signal included in the second signal light with the second carrier light.

7. The optical frequency-division multiplexer according to claim 4, wherein an optical fiber is used as the non-linear optical medium.

8. The optical frequency-division multiplexer according to claim 1, wherein WDM couplers are used as the first and second optical couplers.

9. The optical frequency-division multiplexer according to claim 4, wherein the first signal light is a sub-carrier signal light modulated by a sub-carrier modulated signal obtained by modulating a carrier having a specific frequency using the first data signal.

10. The optical frequency-division multiplexer according to claim 9, wherein the second signal light is a sub-carrier signal light modulated by a sub-carrier modulated signal obtained by modulating a carrier having a specific frequency which is different from a frequency of the first data signal using the third data.

11. The optical frequency-division multiplexer according to claim 10, wherein the first signal light and the second signal light are sub-carrier signal lights modulated using frequency-division multiplexed signals of sub-carrier modulated signals obtained by modulating a plurality of carriers using the first and third data signals, respectively.

12. An optical communication system forming an optical network, the optical communication system comprising:
a plurality of optical frequency-division multiplexers, each configured to include:
a first optical coupler configured to receive at a first input output point a wavelength-division multiplexed light obtained by wavelength-division multiplexing a first carrier light and a first monitor light and to split the first carrier light and the first monitor light from each other,
an optical modulator configured to optically modulate the first carrier light split by from the first optical coupler using a signal including a first data signal so as to multiplex the first data signal with the first carrier light,
an optical power coupler configured to receive the first monitor light from the second optical coupler and to split the first monitor light into a first and second part of the first monitor light,
a receiver configured to receive the first part of the first monitor light and to demodulate a second data signal from the first part of the first monitor light, and
a second optical coupler configured to couple the second part of the first monitor light and the first carrier light with which the first data signal has been multiplexed and to transmit the coupled light from a second input output point to the optical network,
a plurality of terminals, each configured to include:
a photoreceiver configured to receive the first carrier light from the optical network and convert the first carrier light to a sub-carrier multiplexed signal,
a band pass filter configured to filter the sub-carrier multiplexed signal to obtain a sub-carrier modulated signal, and
a demodulator configured to demodulate the first data signal from the sub-carrier modulated signal; and
an optical fiber via which the plurality optical frequency-division multiplexers are arranged between the plurality of terminals,
wherein the plurality of optical frequency-division multiplexers transmit respective first carrier lights modulated using different sub-carrier signal lights to the optical network.

13. The optical communication system according to claim 12, wherein each of the plurality of terminals couples the first carrier light from the optical network with a local light, and receives the resultant light by the photoreceiver.

14. An optical frequency-division multiplexing method comprising:
receiving at a first input output point a first wavelength-division multiplexed light obtained by wavelength-division multiplexing a first carrier light and a first monitor light;
splitting the first carrier light and the first monitor light from each other;
optically modulating the split first carrier light using a signal including a first data signal so as to multiplex the first data signal with the first carrier light;
splitting the first monitoring light into a first and a second part of the first monitor light;
demodulating a second data signal from the first part of the split first monitor light;
coupling the second part of the first monitor light and the first carrier light with which the first data signal has been multiplexed; and
transmitting the coupled light to an optical network from a second input output point.

15. An optical frequency-division multiplexing method comprising:
optically modulating a first carrier light using a signal including a first data signal so as to multiplex the first data signal with the first carrier light;
supplying the first data signal multiplexed with the first carrier light to a second input output point;
receiving a first monitor light from the second input output point;
splitting the first data signal multiplexed with the first carrier light and the first monitor light;
receiving the first monitor light from the second optical coupler;
splitting the first monitor light into a first and a second part of the first monitor light;
demodulating a second data signal from first;
part of the first monitor light;
supplying the second part of the first monitor light to a first input output point;
receiving the first carrier light from the first input output point;
transmitting the first monitor light to an optical network.

16. The optical frequency-division multiplexing method according to claim 14, further comprising:
receiving a second wavelength-division multiplexed light obtained by wavelength-division multiplexing a second carrier light and a second monitor light having wavelengths different from wavelengths of the first carrier light and the first monitor light, the second wavelength-division multiplexed light being supplied from the second input output point;
optically modulating the split second carrier light using a signal including a third data signal so as to multiplex the third data signal with the second carrier light;
demodulating a fourth data signal from a branched part of the split second monitor light;
coupling a remaining part of the split second monitor light and the carrier light with which the third data signal has been multiplexed; and
transmitting the coupled light to the optical network from the first input output point.

* * * * *

UNITED STATES PATENT AND TRADEMARK OFFICE
CERTIFICATE OF CORRECTION

| | | |
|---|---|---|
| PATENT NO. | : 9,106,354 B2 | Page 1 of 1 |
| APPLICATION NO. | : 13/771606 | |
| DATED | : August 11, 2015 | |
| INVENTOR(S) | : Shigeki Watanabe et al. | |

It is certified that error appears in the above-identified patent and that said Letters Patent is hereby corrected as shown below:

In the claims,

Claim 12, Column 15, Line 34

Delete "by from" and insert --from--, therefor.

Claim 15, Column 16, Line 38

Delete "from first;" and insert --from the first;--, therefor.

Signed and Sealed this
Seventeenth Day of May, 2016

Michelle K. Lee
*Director of the United States Patent and Trademark Office*